US012675714B2

(12) United States Patent
Outon et al.

(10) Patent No.: US 12,675,714 B2
(45) Date of Patent: Jul. 7, 2026

(54) MID-CYCLE PREDICTIONS USING MACHINE LEARNING

(71) Applicant: Deere & Company, Moline, IL (US)

(72) Inventors: Luis Pazos Outon, Mountain View, CA (US); Mustafa Gurbuz, Atlanta, GA (US); Carlos Riquelme, Zurich (CH); Maxim Neumann, Zurich (CH)

(73) Assignee: Deere & Company, Moline, IL (US)

( * ) Notice: Subject to any disclaimer, the term of this patent is extended or adjusted under 35 U.S.C. 154(b) by 628 days.

(21) Appl. No.: 18/135,038

(22) Filed: Apr. 14, 2023

(65) Prior Publication Data

US 2024/0346345 A1      Oct. 17, 2024

(51) Int. Cl.
*G06N 5/04*        (2023.01)
*G06N 5/022*       (2023.01)
*G06N 20/00*       (2019.01)

(52) U.S. Cl.
CPC .............. *G06N 5/04* (2013.01); *G06N 5/022* (2013.01); *G06N 20/00* (2019.01)

(58) Field of Classification Search
CPC ........ G06N 20/00; G06N 3/045; G06N 5/022; G06N 5/04; G06V 10/764; G06V 10/774; G06V 10/776; G06V 20/13; G06V 20/188; G06V 20/70; G06V 2201/10
See application file for complete search history.

(56) References Cited

U.S. PATENT DOCUMENTS

| | | | | |
|---|---|---|---|---|
| 11,308,595 B1 * | 4/2022 | Wheeler | ................... | G06T 5/50 |
| 11,354,596 B2 * | 6/2022 | Bonaci | ................. | G06F 16/284 |
| 11,521,380 B2 * | 12/2022 | Ahmed | ................. | G06F 18/285 |
| 11,900,671 B2 * | 2/2024 | Aune | .................... | G06N 3/0464 |
| 12,039,452 B2 * | 7/2024 | Basu | ..................... | G06N 3/084 |
| 12,315,249 B2 * | 5/2025 | Ma | ......................... | G06V 20/70 |
| 12,333,786 B2 * | 6/2025 | Li | ......................... | G06V 20/188 |
| 2003/0152292 A1 * | 8/2003 | Scott | .................... | G06T 3/4053 |
| | | | | 382/302 |

(Continued)

OTHER PUBLICATIONS

He et al., "Masked Autoencoders Are Scalable Vision Learners" arXiv:2111.06377v3 [cs.CV] 14 pages, dated Dec. 19, 2021.

(Continued)

*Primary Examiner* — Boubacar Abdou Tchoussou

(74) *Attorney, Agent, or Firm* — Fenwick & West LLP

(57)        ABSTRACT

Implementations are disclosed for training and/or applying a single machine learning model to generate mid-cycle inferences based on variable length time series inputs. In some implementations, a time series of satellite imagery samples that depict an agricultural area over all or part of a crop cycle may be obtained. During training, ground truth agricultural classifications may be obtained for geographic units of the agricultural area represented by individual pixels of the satellite imagery samples. During training, sample(s) of the time series may be masked to generate a partially masked satellite imagery samples, which in turn may be used to generate input embedding(s). The input embedding(s) may be applied across a machine learning model to generate output(s) representing in-season agricultural prediction(s). During training, the in-season agricultural prediction(s) may be compared with the ground truth agricultural classifications to train the machine learning model.

20 Claims, 9 Drawing Sheets

(56) References Cited

U.S. PATENT DOCUMENTS

| | | | | |
|---|---|---|---|---|
| 2021/0012902 | A1 | 1/2021 | Chawla et al. | |
| 2021/0209424 | A1* | 7/2021 | Jha | G06V 10/764 |
| 2022/0156492 | A1* | 5/2022 | Basu | G06T 5/50 |
| 2024/0135683 | A1* | 4/2024 | Li | G06V 20/13 |
| 2024/0212068 | A1* | 6/2024 | Qian | G06N 3/042 |

OTHER PUBLICATIONS

Sun et al., "Learning Sparse Sharing Architectures for Multiple Tasks" ArXiv:1911.05034v2 [cs.CL] 8 pages, dated Nov. 16, 2019.
Vaswani et al., "Attention Is All You Need" arXiv:1706.03762v5 [cs.CL], 15 pages, dated Dec. 6, 2017.
Zhang et al, "Graph Masked Autoencoders with Transformers" arXiv:2202.08391v2 [cs.CL] 12 pages, dated May 12, 2022.
Dwibedi et al., "Counting Out Time: Class Agnostic Video Repetition Counting in the Wild" arXiv:2006.15418v1 [cs.CV] 15 pages, dated Jun. 27, 2020.
Rahate et al., "Multimodal Co-learning: Challenges, Applications with Datasets, Recent Advances and Future Directions" 77 pages.
Kendall et al., "Multi-Task Learning Using Uncertainty to Weigh Losses for Scene Geometry and Semantics" arXiv:1705.07115v3 [cs.CV] 14 pages, dated Apr. 24, 2018.
Yuan et al., "Self-Supervised Pretraining of Transformers for Satellite Image Time Series Classification" IEEE Journal of Selected Topics in Applied Earth Observations and Remote Sensing, vol. 14. 14 pages, dated 2021.
"A Time Series is Worth 64 Words: Long-term Forecasting with Transformers" ICLR, 24 pages, dated 2023.
Kendall et al., "Multi-Task Learning Using Uncertainty to Weigh Losses for Scene Geometry and Semantics" Computer Vision Foundation, 10 pages.

* cited by examiner

Fig. 4

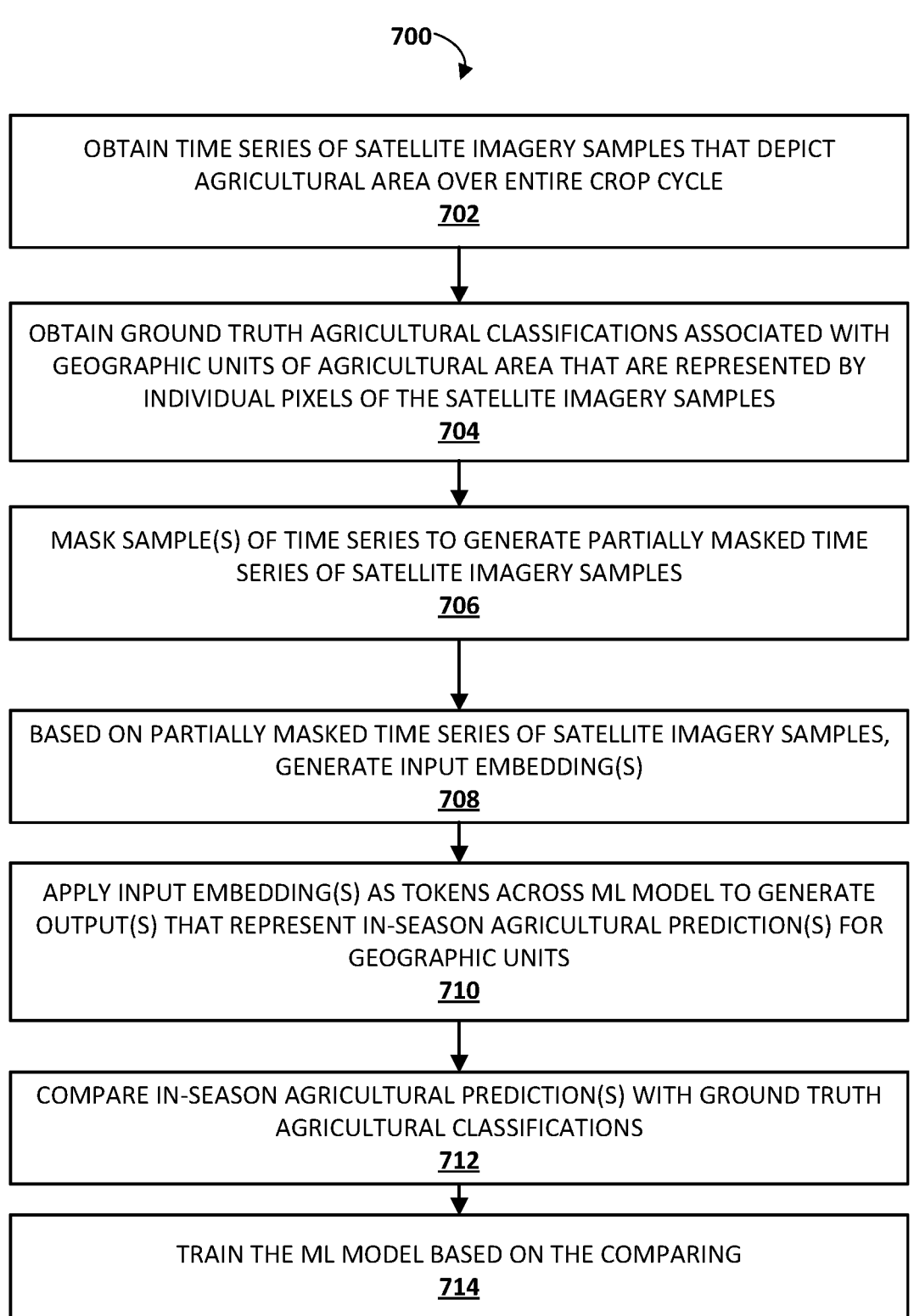

700

OBTAIN TIME SERIES OF SATELLITE IMAGERY SAMPLES THAT DEPICT
AGRICULTURAL AREA OVER ENTIRE CROP CYCLE
702

OBTAIN GROUND TRUTH AGRICULTURAL CLASSIFICATIONS ASSOCIATED WITH
GEOGRAPHIC UNITS OF AGRICULTURAL AREA THAT ARE REPRESENTED BY
INDIVIDUAL PIXELS OF THE SATELLITE IMAGERY SAMPLES
704

MASK SAMPLE(S) OF TIME SERIES TO GENERATE PARTIALLY MASKED TIME
SERIES OF SATELLITE IMAGERY SAMPLES
706

BASED ON PARTIALLY MASKED TIME SERIES OF SATELLITE IMAGERY SAMPLES,
GENERATE INPUT EMBEDDING(S)
708

APPLY INPUT EMBEDDING(S) AS TOKENS ACROSS ML MODEL TO GENERATE
OUTPUT(S) THAT REPRESENT IN-SEASON AGRICULTURAL PREDICTION(S) FOR
GEOGRAPHIC UNITS
710

COMPARE IN-SEASON AGRICULTURAL PREDICTION(S) WITH GROUND TRUTH
AGRICULTURAL CLASSIFICATIONS
712

TRAIN THE ML MODEL BASED ON THE COMPARING
714

Fig. 7

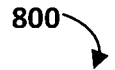

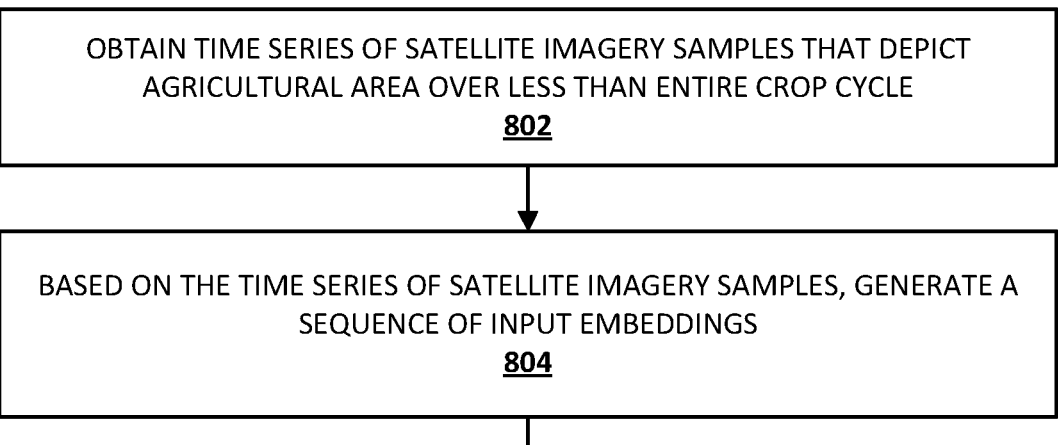

OBTAIN TIME SERIES OF SATELLITE IMAGERY SAMPLES THAT DEPICT AGRICULTURAL AREA OVER LESS THAN ENTIRE CROP CYCLE
802

BASED ON THE TIME SERIES OF SATELLITE IMAGERY SAMPLES, GENERATE A SEQUENCE OF INPUT EMBEDDINGS
804

APPLY THE SEQUENCE OF INPUT EMBEDDINGS AS TOKENS ACROSS A SINGLE MACHINE LEARNING MODEL TO GENERATE ONE OR MORE OUTPUTS, WHEREIN THE ONE OR MORE OUTPUTS REPRESENT ONE OR MORE IN-SEASON AGRICULTURAL PREDICTIONS FOR GEOGRAPHIC UNITS OF THE AGRICULTURAL AREA THAT CORRESPOND TO PIXELS OF THE SATELLITE IMAGERY
806

Fig. 8

MID-CYCLE PREDICTIONS USING MACHINE LEARNING

BACKGROUND

Remote sensing involves measuring reflected and emitted energy to obtain information about a surface. Satellite imagery depicting landmasses can be analyzed using techniques such as machine learning to make various predictions and/or classify terrain into different categories (generally, "inferences"). In the agricultural context, remote sensing can be employed to make agricultural inferences, such as crop type, tillage practice, soil type, crop health, crop yield, etc., based on satellite imagery.

SUMMARY

Various types of machine learning models may be trained to generate output indicative of inferences (agricultural or otherwise) based on remote sensing data such as satellite imagery. Some machine learning models may be trained to operate on a single satellite image at a time, e.g., to classify geographic land units corresponding to individual pixels of the imagery (e.g., each pixel may have a resolution of 10 m×10 m) as being a particular type of crop, tillage, terrain, urban development, etc.

Other machine learning models may be trained to operate on time series of satellite images captured over periods of time (e.g., an entire crop cycle). In some cases these time series machine learning models may be more accurate than their single input counterparts. However, these time series machine learning models are typically trained to process data captured over specific time intervals. For example, a given transformer may be trained based on data from the first three months of an overall crop cycle, and therefore may be useable to generate agricultural inferences based on three months of data. Using that three-month transformer to process two months of data or five months of data may yield inaccurate agricultural inferences.

To allow for accurate inferences (e.g., including but not limited to agricultural) to be generated at different points in time during a cycle of growth or evolution (e.g., a crop cycle), separate transformers may be trained for distinct time intervals. Suppose a given satellite captures satellite images of an agricultural area seventy-three times per year. Seventy-three time ranges could be defined, where the first range would only include the first image, the second one would include images one and two, the third would include images one, two and three, and so forth until seventy-three. Seventy-three distinct transformers then can be trained, one for each iteration of the agricultural area being captured by the satellite. Likewise, for a more frequent satellite that provided one image per day, for instance, 365 distinct transformers may be defined. However, training and applying transformers (and more generally, machine learning models) can be costly in terms of computing resources, as well as time consuming. Thus, while training multiple different transformers for multiple different time intervals may result in accurate agricultural predictions, it may not be easily scalable.

Implementations are described herein for training a single machine learning model such as a transformer to be usable to generate mid-cycle agricultural based on variable length time series inputs. More particularly, but not exclusively, implementations are described herein for masking various samples of time series satellite imagery during training of the single machine learning model so that the machine learning model is usable to generate accurate inferences, such as crop type classifications, tillage classifications, soil type classifications, etc., at different points during a crop cycle.

In various implementations, a method may be implemented using one or more processors and may include: obtaining a time series of satellite imagery samples that depict an agricultural area over an entire crop cycle; obtaining ground truth agricultural classifications associated with geographic units of the agricultural area that are represented by individual pixels of the satellite imagery samples; masking one or more of the samples of the time series to generate a partially masked time series of satellite imagery samples; based on the partially masked time series of satellite imagery samples, generating one or more input embeddings; applying the one or more input embeddings across a machine learning model to generate one or more outputs, wherein the one or more outputs represent one or more in-season agricultural predictions for the geographic units of the agricultural area; comparing the one or more in-season agricultural predictions with the ground truth agricultural classifications; and training the machine learning model based on the comparing. Subsequent to the training, the same machine learning model may be usable to process other time series of satellite imagery samples depicting agricultural areas over disparate time windows of entire crop cycles to generate outputs representing in-season predictions.

In various implementations, the masking may include applying multiple different masks to the time series of satellite imagery samples to generate multiple different time subseries of satellite imagery samples. In various implementations, each of the multiple different time subseries of satellite imagery samples may depict the agricultural area over a different time window of the entire crop cycle. In various implementations, the generating may include sampling one or more input embeddings from each of the multiple time subseries of satellite imagery samples to create a batch of input embeddings. In various implementations, the batch of input embeddings may be applied across the machine learning model.

In various implementations, the machine learning model may be a transformer. In various implementations, the method may include applying additional data representing labels of previous crop cycles as input across the machine learning model. In various implementations, the one or more in-season agricultural predictions for the geographic units of the agricultural area may include, per geographic unit, one or more of: crop type; tillage; or irrigation.

In another related aspect, a method maybe implemented using one or more processors and may include: obtaining a time series of satellite imagery samples that depict an agricultural area over less than an entire crop cycle; based on the time series of satellite imagery samples, generating a sequence of input embeddings; and applying the sequence of input embeddings across a single machine learning model to generate one or more outputs, wherein the one or more outputs represent one or more in-season agricultural predictions for geographic units of the agricultural area that correspond to pixels of the satellite imagery. In various implementations, the machine learning model may be trained based on training data that includes multiple different time subseries generated from application of different masks to a time series of satellite imagery samples depicting a reference agricultural area over an entire crop cycle. In various implementations, each of the multiple different time subseries may depict the reference agricultural area over a different time window of the entire crop cycle.

In various implementations, the machine learning model may be a transformer. In various implementations, the method may include applying additional data representing labels of previous crop cycles as input across the machine learning model. In various implementations, the one or more in-season agricultural predictions for the geographic units of the agricultural area may include, per geographic unit, one or more of: crop type; tillage; or irrigation.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 depicts an example of how using a single transformer for in-season predictions may exhibit performance that is similar to using multiple "specialized" transformers.

FIG. 6A and FIG. 6B schematically depict examples of how various aspects of the present disclosure may be implemented, in accordance with various embodiments.

FIG. 7 is a flowchart of an example method for training an in-season prediction transformer, in accordance with various implementations described herein.

FIG. 8 is a flowchart of an example method of applying a trained in-season prediction transformer to less than an entire crop cycle of data to make agricultural predictions, in accordance with various implementations described herein.

DETAILED DESCRIPTION

Figure 1:
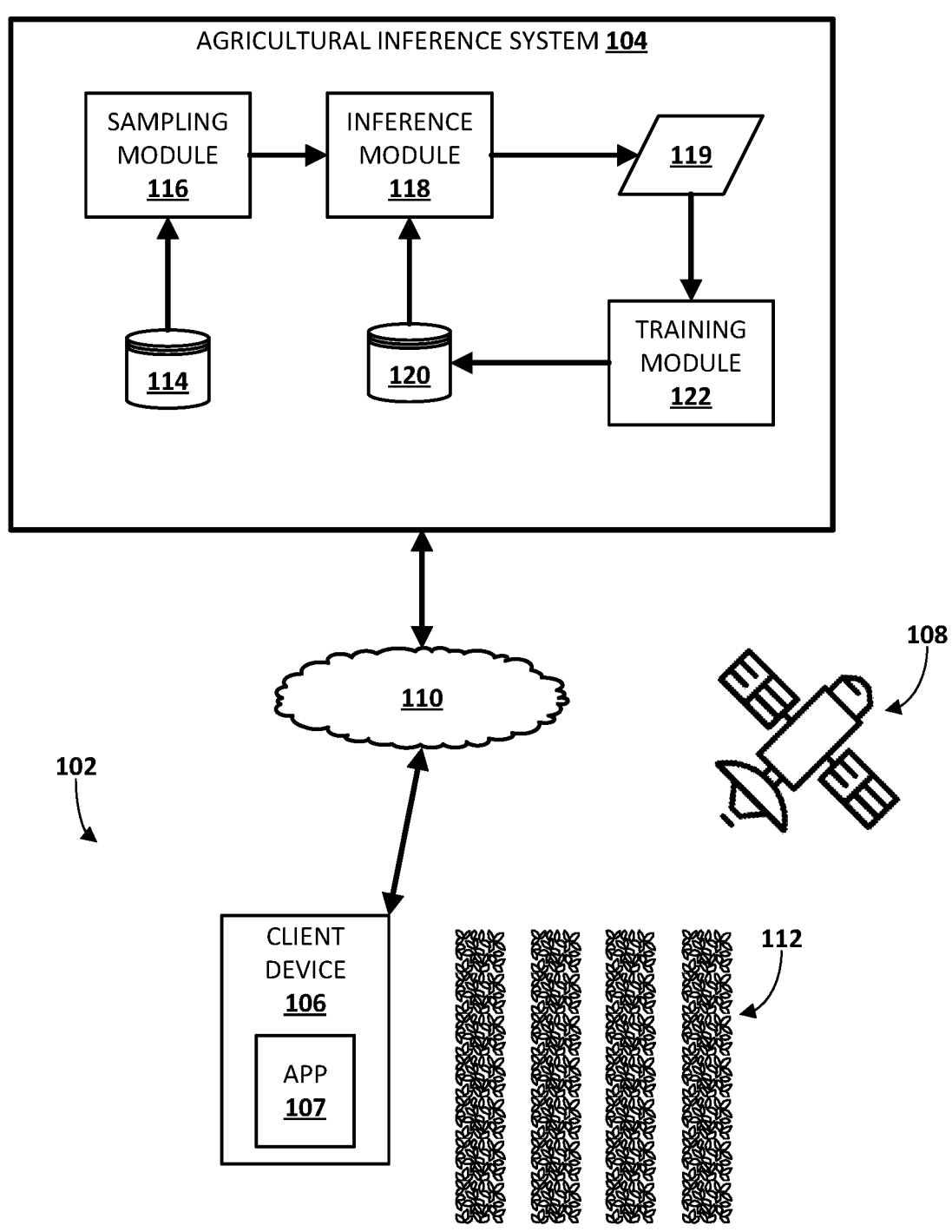
FIG. 1 schematically depicts an example environment in which disclosed techniques may be employed in accordance with various implementations.

Implementations are described herein for training a single machine learning model such as a transformer to be usable to generate in-season agricultural inferences based on variable length time series inputs. More particularly, but not exclusively, implementations are described herein for masking various samples of time series satellite imagery during training of the single machine learning model so that the machine learning model is usable to generate accurate agricultural inferences, such as crop type classifications, tillage classifications, soil type classifications, etc., at different points during a crop cycle.

In various implementations, a time series of satellite imagery samples may be obtained, e.g., directly from the satellite that captured them or from a clearinghouse that stores imagery captured by the satellite. These satellite imagery samples may depict one or more agricultural areas over one or more time periods, such as over an entire crop cycle, over an entire year, etc. Ground truth agricultural classifications of the same agricultural areas, such as crop type classifications, may also be obtained for use as labels for supervised training.

During training of the single machine learning model, at least some samples of the time series of satellite imagery samples may be masked, e.g., replaced with zeroes or null values, to generate a partially masked time series of satellite imagery samples. In some implementations, multiple different masks may be applied to the time series of satellite imagery samples to generate multiple different time subseries of satellite imagery samples. For instance, the time series of N satellite imagery samples may be split into T subseries of N/T samples. Each of the multiple different time subseries of satellite imagery samples may depict the agricultural area over a different time window of the entire crop cycle. For instance, one subseries may include the first month of samples, another subseries may include the first two months of samples, and so forth.

This partially masked time series of satellite imagery samples may be used to generate one or more input embeddings. Each input embedding may include, for instance, data representative of each spectral band of satellite imagery. In some implementations, one or more input embeddings may be sampled, e.g., uniformly, from each of the multiple time subseries of satellite imagery samples to create a batch of input embeddings. The entire sampled batch of input embeddings may then be applied across the machine learning model as described below.

The input embeddings may be applied across the machine learning model (e.g., transformer) to generate output(s). The output(s) may represent in-season agricultural inference(s) for geographic units that are represented by individual pixels of the satellite imagery (e.g., each pixel may portray a 10 m by 10 m area of the ground) of the agricultural area. For example, the output may be a crop type classification map, tillage classification map, or may include other types of terrain classifications. As another example, the output may include predictions such as crop yield predictions, e.g., on a pixel-by-pixel basis (e.g., a prediction of how many fruit will be harvested from a given 10 m by 10 m portion of a strawberry field) or on the basis of an entire agricultural field or plot (e.g., by aggregating predictions from individual pixels).

In some implementations, the machine learning model may be trained as a multitask prediction model that is trained to make multiple different agricultural inferences. For example, the outputs could include both a crop type classification map and one or more predicted crop yields, or the crop type classification map and a tillage map, for instance. In some such implementations, multi-task learning may be employed with some labels missing to train the machine learning model. This may involve wholly or partially masking labels for one of the output classes while training the machine learning model to generate the other output class, as well as doing the reverse.

Whichever type of outputs are generated using the machine learning model, the in-season agricultural inferences represented by the outputs may be compared to the ground truth agricultural classifications, e.g., to generate error(s). Based on these error(s), the machine learning model may be trained using techniques such as back propagation, gradient descent, cross entropy, etc. Once trained, the machine learning model may be usable to process other time series of satellite imagery samples depicting agricultural areas over disparate time windows of entire crop cycles to generate outputs representing in-season predictions.

In some implementations, the machine learning model may be trained to be multi-modal. For example, it may be trained to process input embeddings generated from satellite imagery samples in conjunction with other data. This other data, which may be in a different form than satellite imagery, may provide additional context that enables more accurate agricultural inferences. In some implementations, the other data may include ground truth labels from previous years, such as crop type classifications. These previous labels often may follow generally accepted crop rotations, although this is not required. In some such implementations, including prior years' classifications may enable more accurate in-season predictions, not only for the current season but as a prediction for a future season.

FIG. 1 schematically illustrates one example environment in which one or more selected aspects of the present disclosure may be implemented, in accordance with various implementations. The example environment depicted in FIG. 1 relates to the agriculture domain, but this is not meant to be limiting. Techniques described here may be useful in any domain in which remote sensing is used to classify parcels of land that change over time.

The environment of FIG. 1 includes one or more farms 102 and an agricultural inference system 104. Farm 102 also includes one or more client devices 106 and one or more fields 112 that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soybeans, corn, lettuce, spinach, beans, cherries, nuts, cereal grains, berries, grapes, and so forth. One farm 102 is depicted in detail in FIG. 1 for illustrative purposes. However, there may be any number of farms for which agricultural inferences such as crop type classification.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Agricultural inference system 104 comprises a non-limiting example of a computing system on which techniques described herein may be implemented. Each of client devices 106 and agricultural inference system 104 may include one or more memories for storage of data and software applications, one or more processors for accessing data and executing applications, and other components that facilitate communication over a network. The computational operations performed by client device 106 and/or agricultural inference system 104 may be distributed across multiple computer systems. Client device 106 may operate a variety of different applications that may be used, for instance, to analyze various agricultural inferences. For example, client device 106 operates an application 107 (e.g., which may be standalone or part of another application, such as part of a web browser), which a user can use to view fields and farmland from overhead with annotations such as crop type, predicted crop yield, terrain type, or other agricultural inferences, etc.

In various implementations, agricultural inference system 104 may include a sampling module 116, an inference module 118, and a training module 122. Agricultural inference system 104 may also include one or more databases 114, 120 for storing various data used by and/or generated by modules 116, 118, and/or 122. For example, database 114 may store data such as satellite data captured by one or more satellites 108, other sensor data gathered by farm equipment and/or personnel on the ground, user-input data, weather data, and so forth. Database 120 may store machine learning models that are applied by inference module 118 to generate agricultural inferences and/or trained by training module 122 to train one or more in-season prediction and/or classification machine learning models. In some implementations one or more of modules 116, 118, and/or 122 may be omitted, combined, and/or implemented in a component that is separate from agricultural inference system 104, such as on client device 106. In some implementations, agricultural inference system 104 may be considered cloud-based computing resources as it may be implemented across one or more computing systems that may be referred to as the "cloud."

In some implementations, sampling module 116 may be configured to sample time series satellite data captured by satellite 108. Sampling module 116 may provide this sampled time series satellite data to inference module 118. In some implementations, the sampled time series satellite data may be processed, e.g., continuously, periodically, on demand, etc., by inference module 118, using one or more ML models stored in database 120 to generate output requested by one or more users. In various implementations, sampling module 116 may sample other data as well, such as historical crop type classifications, sensor data captured by ground vehicles (e.g., agricultural robots such as rovers) and/or drones, and so forth.

Various types of machine learning models may be applied by inference modules 118 to generate various types of agricultural predictions and/or classifications. Additionally, various types of machine learning models may be used to generate semantically rich embeddings that are applied as input across the various machine learning models. These various machine learning models may include, but are not limited to, recurrent neural networks (RNNs), long short-term memory (LSTM) networks (including bidirectional), gated recurrent unit (GRU) networks, graph neural networks (GNNs), transformer networks (e.g., the same as or similar to those often used as large language models), feed-forward neural networks, convolutional neural networks (CNNs), support vector machines, random forests, decision trees, etc. As used herein, a "transformer" may include, but is not necessarily limited to, a machine learning model that incorporates a "self-attention" mechanism, and that is usable to process an entire sequence of inputs at once, as opposed to iteratively.

Training module 122 may be configured to train various machine learning models described herein. These models may include those stored in database 120, such as crop classification transformers, crop yield prediction models, etc., as well as other machine learning models that are employed to encode various modalities of input data into embeddings. In various implementations, training module 122 may be configured to train transformers and other types of models to generate in-season agricultural predictions and classifications. As used herein, an "in-season" prediction or classification is one that is made in the middle of a crop cycle, without the benefit of an entire crop cycle worth of observations. Nonetheless, with techniques described herein, a machine learning model such as a transformer can be trained to make accurate agricultural predictions and/or classifications, such as crop type, relatively early in a crop cycle.

Figures 2A, 2B:
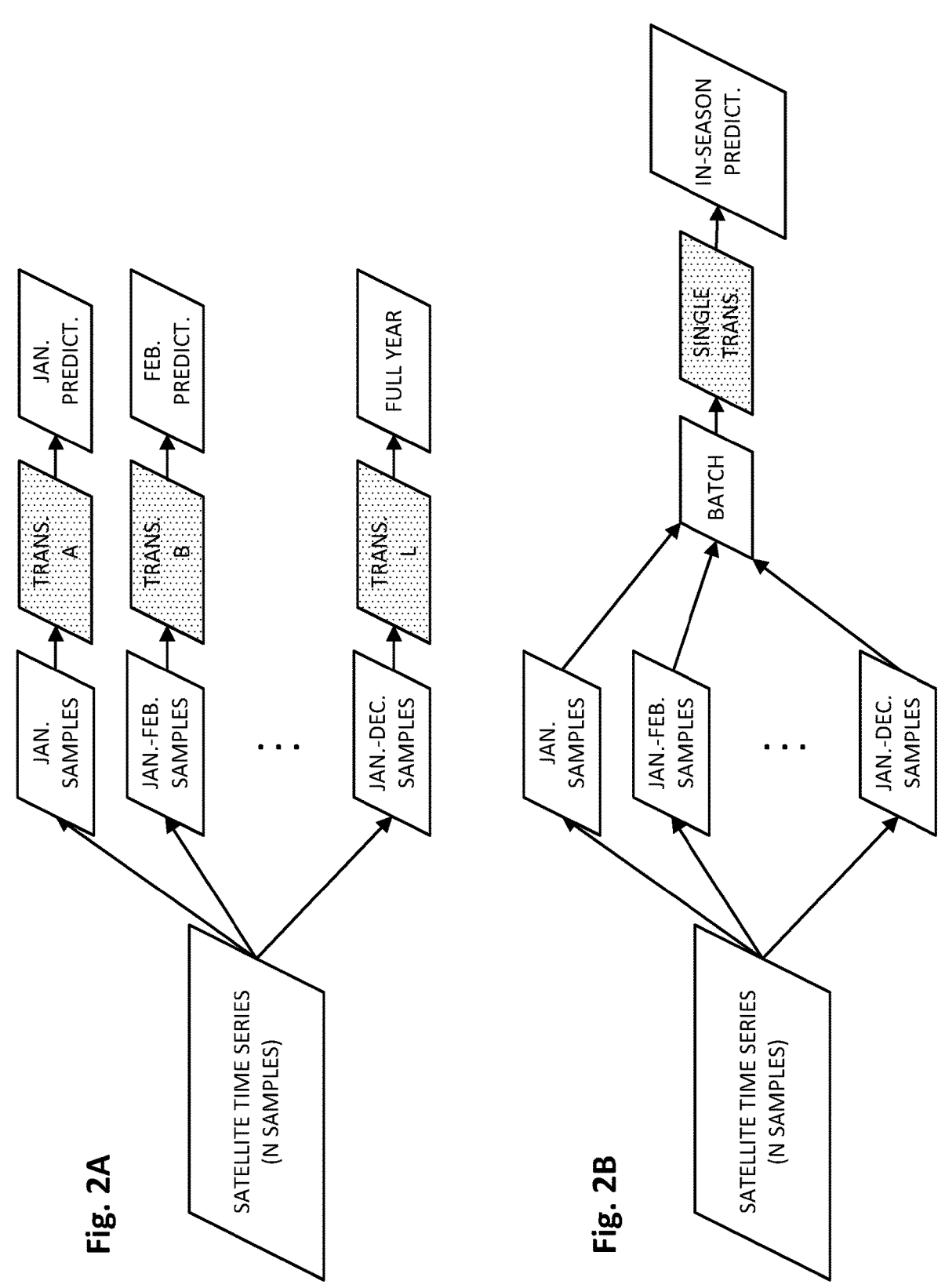
FIG. 2A and FIG. 2B schematically depict examples of how various aspects of the present disclosure may be implemented, in accordance with various embodiments.

FIGS. 2A and 2B schematically demonstrate different techniques for training to generate in-season agricultural predictions and/or classifications. For the sake of simplicity and understanding, these and other figures assume that a crop cycle coincides with the calendar year. However, this should not be construed as limiting, as any number of crops may be grown in crop cycles that are not aligned with a calendar year. Likewise, time series data may be obtained across multiple years to leverage satellite information from prior years and provide more context.

Starting at the left of FIG. 2A, N (positive integer) samples of satellite data (e.g., N images, N pixel values) are obtained, e.g., by sampling module 116 (not depicted in FIGS. 2A-B). As shown by the arrows, only January samples may be processed using a first transformer (TRANS. A) that is trained specifically using satellite data captured during January. The result is a prediction or classification (e.g., crop type) for each pixel (e.g., which may correspond to a geographic unit of, for instance, ten meters squared) of the satellite data based on the January data. Because January is early in the crop cycle, this prediction or classification may not be as accurate as predictions/classifications made with subsequent months data. Nonetheless, this inaccuracy (or "error") is usable, e.g., by training module 122, to train the TRANS. A transformer.

January and February samples can be processed using a second transformer (TRANS. B) that is trained specifically using satellite data captured during both January and February. This may result in a prediction or classification that is somewhat more accurate than the January prediction, albeit still not likely to be highly accurate. Nevertheless, this inaccuracy can be used, e.g., by training module 122, to train the TRANS. B transformer.

As indicated by the ellipses, this process can continue until all samples from January through December are processed by a final transformer (TRANS. L). The final transformer may be trained specifically using satellite data captured during the entire crop cycle of January through December. The result generated by this final transformer may be the most accurate.

Figure 4:
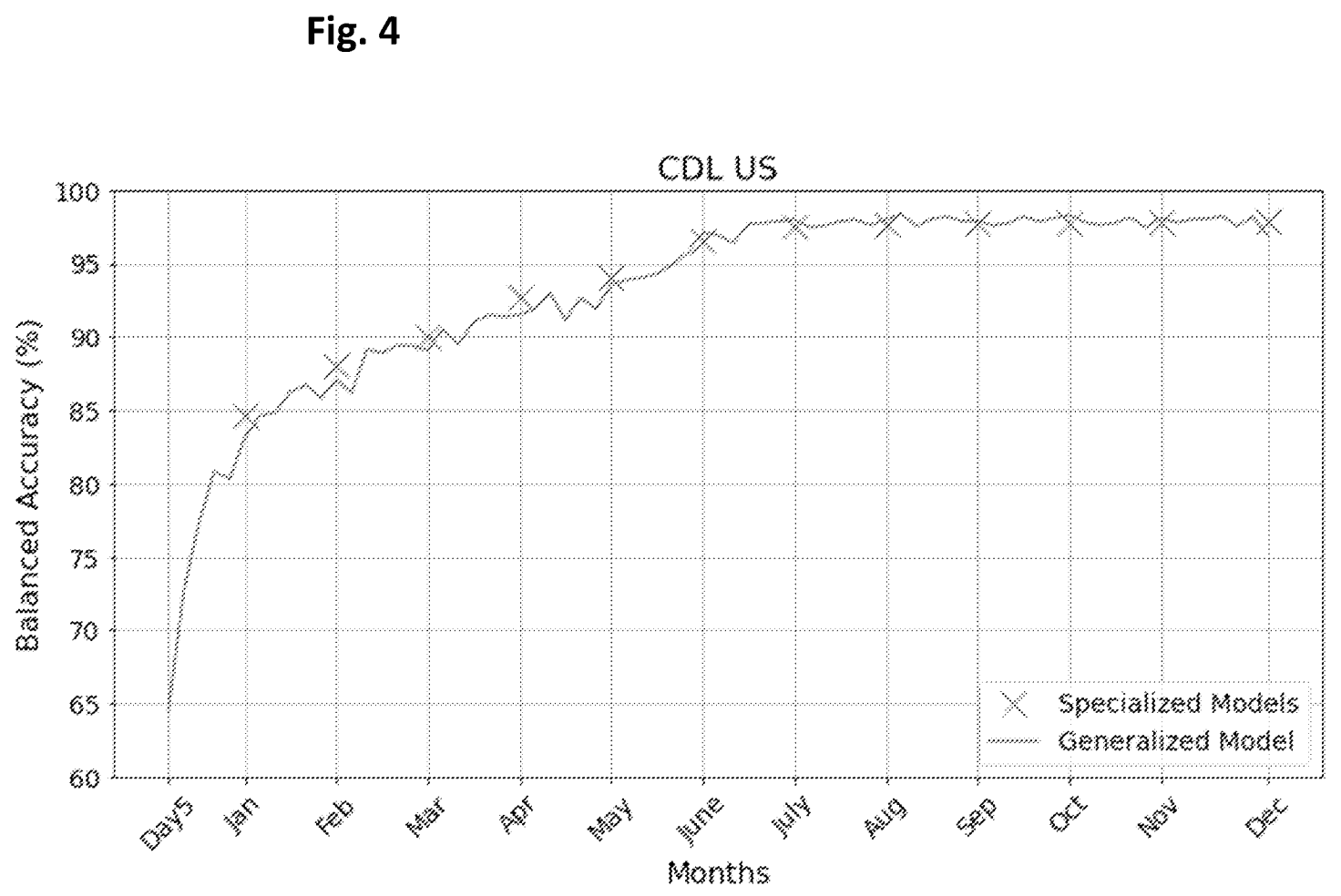

The training scheme demonstrated in FIG. 2A may result in transformers (TRANS. A, TRANS. B, . . . , TRANS. L) that are capable of generating highly accurate results based on in-season time series data. Example results are shown in FIG. 4, which depicts a Cropland Data Layer (CDL) chart for the United States. The vertical axis of the chart represents a balanced accuracy percentage metric for agricultural predictions generated using the arrangements of FIGS. 2A and 2B. The horizontal axis represents months of data available. The "Specialized Models" X's in FIG. 4 represent example data generated by the transformers of FIG. 2A. It can be seen that at the end of January, the accuracy of agricultural predictions reaches approximately 84%. This climbs to approximately 87% at the end of February. By the time June satellite imagery is available the accuracy of agricultural predictions generated by the arrangement of FIG. 2A has reached over 95%. Notably, the accuracy of the "Specialized Models" does not improve dramatically thereafter.

A challenge with the specialized models arrangement of FIG. 2A, however, is that it is difficult to scale. Training a separate, specialized transformer for each interval (e.g., month) of data may be costly, from a computational standpoint as well as economic and/or temporal standpoints. As there are numerous types of crops grown across the planet, training separate and specialized transformers not only for each crop, but for multiple sampling intervals within each crop, may be cost prohibitive.

Figures 3A, 3B:
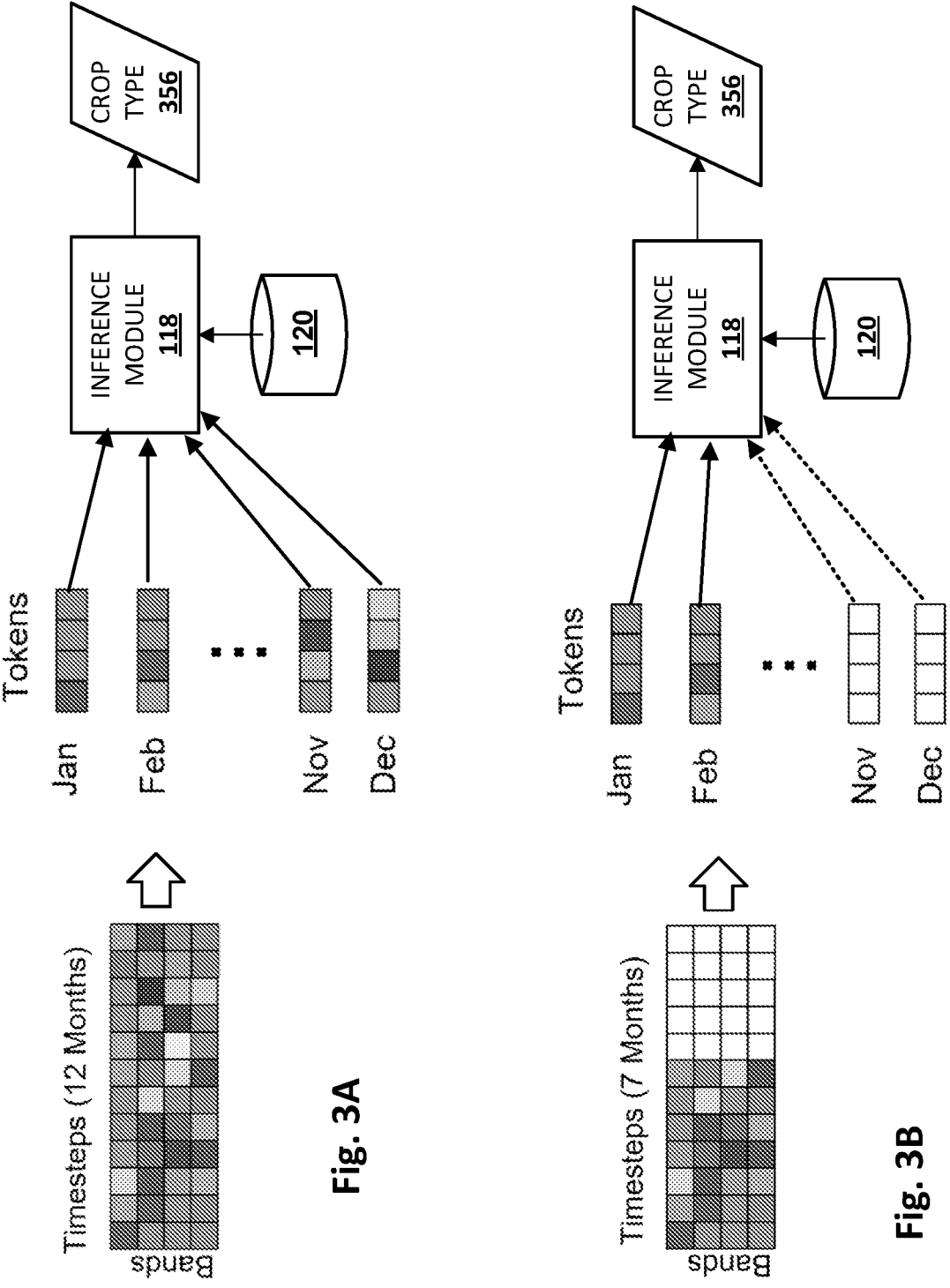
FIG. 3A and FIG. 3B schematically depict examples of how various aspects of the present disclosure may be implemented, in accordance with various embodiments.

Accordingly, in various implementations described herein, the training process demonstrated by FIG. 2B may be used instead to train a single transformer ("SINGLE TRANS."). In FIG. 2B, N (positive integer) samples of satellite data (e.g., N images, N pixel values) are once again obtained, e.g., by sampling module 116 (not depicted in FIGS. 2A-B). Unlike in FIG. 2A, in FIG. 2B, the single generalized transformer ("SINGLE TRANS.") is used to process input samples, no matter which months' data are available. For example, in some implementations, the N samples of satellite data may be split into increments, such as into months. In some implementations, these increments may be formed by applying different masks to the original satellite image samples. FIGS. 3A and 3B provide more detail about how this masking may be implemented for inference.

Additional sampling may be performed from these increments, e.g., uniformly or otherwise, to generate a batch of input samples. The batch of input samples may then be processed, e.g., by inference module 118 or training module 122, using the single transformer to generate in-season prediction(s). During training, these in-season prediction(s) may be compared, e.g., by training module 122, to ground truth observations (e.g., crop type classification(s)). Based on this comparison, training module 122 may train (e.g., update) the single transformer. During inference, the in-season prediction(s) may have accuracies that are comparable to those of the multiple transformer arrangement of FIG. 2A. As shown by the "Generalized Model" line in FIG. 4, the generalized transformer of FIG. 2B generates predictions with accuracies that are more or less similar to the specialized transformers of FIG. 2A, especially at the end of June and beyond.

FIGS. 3A and 3B demonstrate, in somewhat more detail than FIGS. 2A-B, an example of how bands of satellite imagery can be processed, in accordance with various implementations. In FIG. 3A, starting at left, twelve (e.g., months of) timestamps, each having four bands of spectral data, are provided for each pixel (and hence, each underlying geographic unit of, say, 10 meters by 10 meters) of satellite imagery. These bands are then processed, e.g., as vectors, embeddings, vertical slices, etc., by inference module 118 using a transformer 120. Based on this processing, inference module 118 generates a crop type classification 356 for that pixel (and hence, the underlying geographic unit represented by the pixel). Crop type classification 356 may be, for instance, "corn," "soybean," "wheat," "alfalfa," or any other type of crop.

FIG. 3B demonstrates an example of how the single transformer 120 used by inference module 118 may be trained. In FIG. 3B, although an entire crop cycle of data may be available, some of the data is masked. To train the transformer, multiple time ranges may be created, such as January to February, January to March, and so on, by masking out the remainder of the year. For example, to create a January to February range, all data points from March to December may be masked. To create a range from January to March, all data points from April to December may be masked, and so on. In FIG. 3B, this concept is illustrated for the range January through July. Data for the months of August through December is masked, as indicated by the white blocks. The remaining data (January through July) is left intact. The entire years' data, including both the intact data from January through July as well as the masked data from August to December, may be processed by inference module 118 using the single transformer 120 to generate a crop type classification 356, as illustrated by FIG. 3A. Training module 122 may then compare a classification 356 to a ground truth classification, and may train transformer 120 based on this comparison, e.g., using techniques such as gradient descent, back propagation, cross entropy, etc.

In-season agricultural predictions may be made more accurate by applying input data in addition to the time series satellite data. For example, in some implementations, a pixel's crop type classification(s) during prior crop cycle(s) may be applied as inputs across the transformer, and satellite imagery from previous (or later) years can be provided to generate more accurate in-season predictions of crop types.

Figure 5:
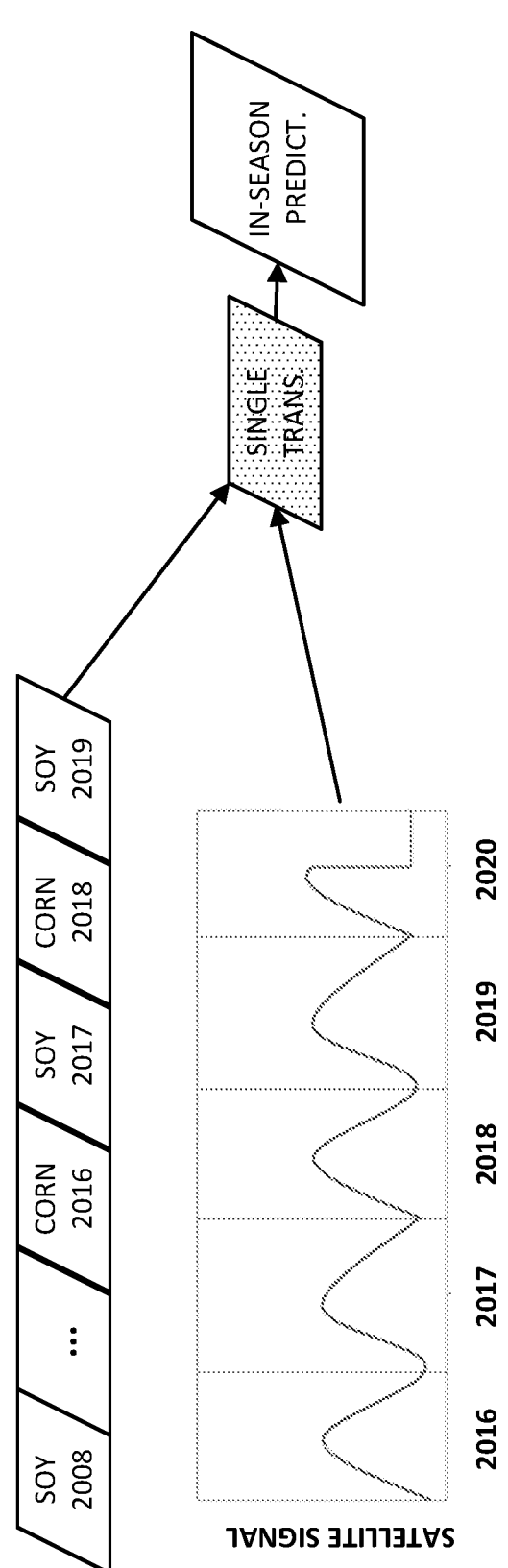
FIG. 5 schematically depicts another example of how techniques described herein may be implemented.

An example of this is depicted in FIG. 5. At top left, crop type labels assigned to a particular geographic unit (e.g., corresponding to a pixel of satellite data) over some number of years, from 2008 to 2019 in this example may be applied as additional inputs to the single transformer, along with time series satellite data for the years 2016 to 2019. These prior years' labels may represent a crop rotation applied to the particular geographic unit. Accordingly, it can be seen that the geographic unit has been alternatively used to plant soy and corn. Based on these additional input data, the single transformer (as applied by inference module 118) may generate an in-season prediction for the year 2020 that accounts for those prior years' labels, effectively taking into account a larger crop rotation applied in the geographic area. In some implementations, the technique demonstrated in FIG. 5 may be used to predict future season(s)' crops. This may, for instance, provide estimates of future demand for seed manufacturers.

Figure 6A:
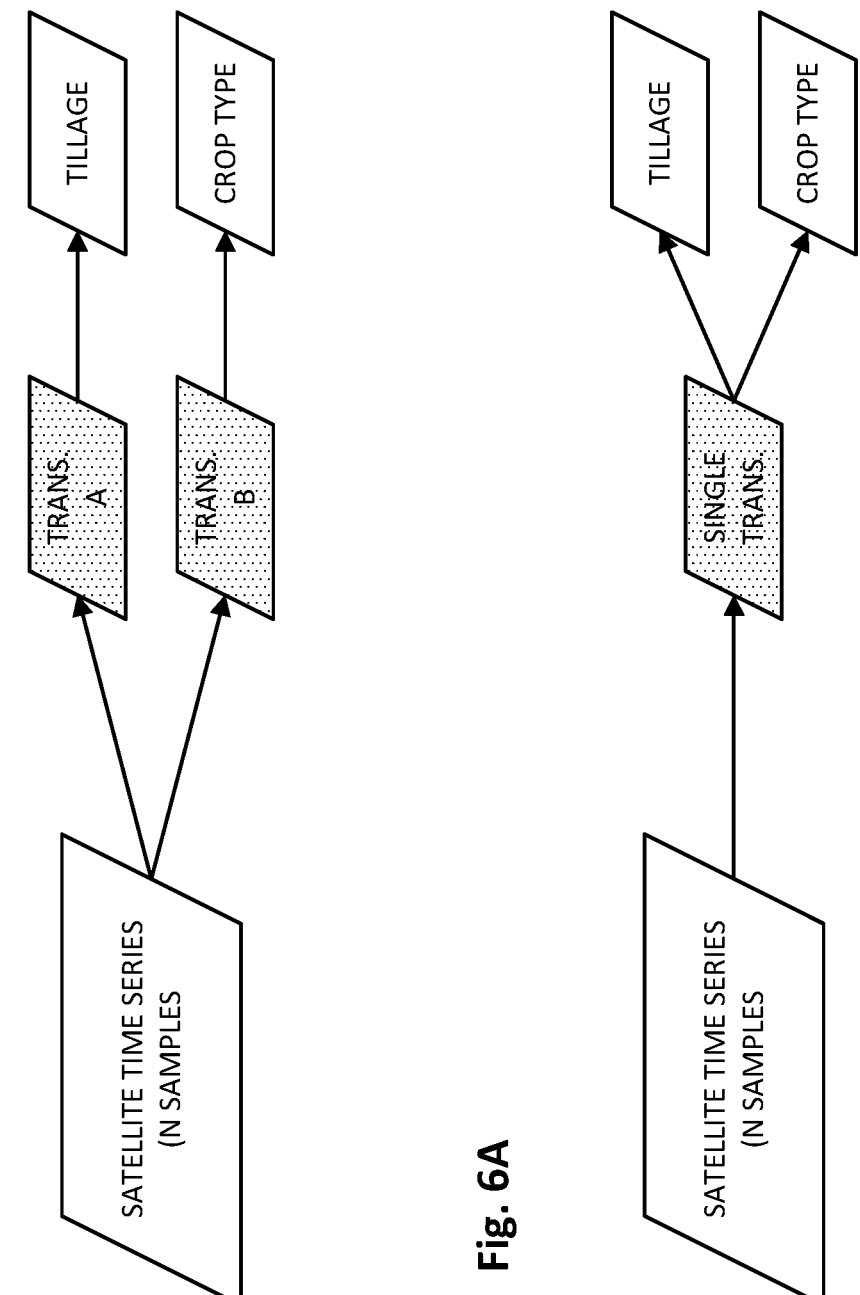

In some implementations, sparse multitask learning may be applied in order to train a single transformer (or other model) to make multiple different predictions about a geographic unit corresponding to a satellite image pixel at once. Referring now to FIG. 6A, two transformers, "Trans. A" and "Trans. B," are trained separately to predict, from the same satellite time series (N samples), both a tillage practice (which may or may not be binary, e.g., "tilled" versus "not tilled") and a crop type (multiple different classes available) of each geographic unit. While training and applying separate transformers for each type of classification can yield accurate predictions, it may be costly and/or time consuming to do so.

Accordingly, and similar to previous implementations, a single model, e.g., a transformer, may be trained to make multiple different classifications at once. An example of this is depicted in FIG. 6B, where a single transformer is trained to generate both a tillage classification and a crop type classification for a given geographic unit underlying a pixel of satellite data. In some implementations, a single transformer such as that depicted in FIG. 6B may be trained to solve multiple tasks at once by masking different labels at various points in time during training. For example, the ground truth tillage labels (e.g., "tilled" versus "not tilled") may be masked out, so that the model can be trained in that instance based on the crop type classification. Likewise, the ground truth crop type classifications (e.g., "corn" versus "soy" versus "wheat") may be masked out, so that the model can be trained in that instance based on the tillage classification. Training the model in this way may yield predictions with accuracies that are commensurate with, and in some cases better than, a model trained without masking.

FIG. 7 illustrates a flowchart of an example method 700 for practicing selected aspects of the present disclosure, particularly training a single machine learning model such as a transformer to generate in-season predictions based on temporally disparate time series input data. For convenience, operations of method 700 will be described as being performed by a system configured with selected aspects of the present disclosure. Other implementations may include additional operations than those illustrated in FIG. 7, may perform operation(s) of FIG. 7 in a different order and/or in parallel, and/or may omit one or more of the operations of FIG. 7.

At block 702, the system, e.g., by way of sampling module 116 or training module 122, may obtain a time series of satellite imagery samples that depict an agricultural area over an entire crop cycle. At block 704, the system, e.g., by way of training module 122, may obtain ground truth agricultural classifications associated with geographic units of the agricultural area that are represented by individual pixels of the satellite imagery samples. For example, training module 122 may obtain historical CDL labels for the terrain depicted in the satellite imagery obtained in block 702.

At block 706, the system, e.g., by way of any of modules 116-118 or 122, may mask one or more of the samples of the time series to generate a partially masked time series of satellite imagery samples. For example, as shown in FIG. 3B, some months' data (e.g., January through July) may be masked, e.g., with zeros, null values, etc., leaving other months' data (e.g., August through December) unmasked. While the examples of FIGS. 3A-B depicted a crop cycle coinciding with a calendar year, this is not meant to be limiting, and crop cycles may vary depending on the crop grown, climate conditions, agricultural management practices, etc.

In some implementations, the masking of block 706 may include applying multiple different masks to the time series of satellite imagery samples to generate multiple different time subseries of satellite imagery samples. Each of the multiple different time subseries of satellite imagery samples depict the agricultural area over a different time window of the entire crop cycle. For example, the data was split into groups of samples by month in FIGS. 2A-B. In some such implementations, one or more input embeddings may be sampled from each of the multiple time subseries of satellite imagery samples, e.g., uniformly, randomly, etc., to create a batch of input embeddings. Inference module 118 and/or training module 122 may apply the batch of input embeddings across the machine learning model at block 710.

Based on the partially masked time series of satellite imagery samples, at block 708, the system, e.g., by way of sampling module 116 or inference module 118, may generate one or more input embeddings, e.g., in the form of embeddings and/or vectors. For instance, an input vector may be values for some number of spectral bands in a pixel of satellite data. Additionally or alternatively, in some implementations, multiple spectral bands for the pixel may be encoded into a discrete or continuous vector embedding.

At block 710, the system, e.g., by way of inference module 118 or training module 122, may apply the one or more input embeddings across a machine learning model, such as the single transformer depicted in several of the figures, to generate one or more outputs. In various implementations, the output(s) may represent one or more in-season agricultural predictions for the geographic units of the agricultural area. At block 712, the system, e.g., by way of training module 122, may compare the one or more in-season agricultural predictions generated at block 710 with the ground truth agricultural classifications obtained at block 704.

Based on this comparison, at block 714, the system, e.g., by way of training module 122, may train the machine learning model, e.g., using techniques such as stochastic gradient descent, back propagation, cross entropy, etc. Subsequent to the training of block 714, the same machine learning model may be usable to process other time series of satellite imagery samples depicting agricultural areas over disparate time windows of entire crop cycles to generate outputs representing in-season predictions.

FIG. 8 illustrates a flowchart of an example method 800 for practicing selected aspects of the present disclosure, such as applying the machine learning model trained using the method 700 depicted in FIG. 7. For convenience, operations of method 800 will be described as being performed by a system configured with selected aspects of the present disclosure. Other implementations may include additional operations than those illustrated in FIG. 8, may perform operation(s) of FIG. 8 in a different order and/or in parallel, and/or may omit one or more of the operations of FIG. 8.

At block 802, the system, e.g., by way of sampling module 116 and/or inference module 118, may obtain a time series of satellite imagery samples that depict an agricultural area over less than an entire crop cycle. The operation(s) of block 802 may be similar to those of block 702.

Based on the time series of satellite imagery samples, at block 804, the system, e.g., by way of sampling module 116 and/or inference module 118, may generate a sequence of input embeddings. The operations of block 804 may share various characteristics with the operations of block 708.

At block 806, the system, e.g., by way of inference module 118, may apply the sequence of input embeddings across a single machine learning model, such as the single transformer depicted in various figures, to generate one or more outputs. The one or more outputs may represent one or more in-season agricultural predictions for geographic units of the agricultural area that correspond to pixels of the satellite imagery. Notably, the machine learning model may have been trained based on training data that included multiple different time subseries generated from application of different masks to a time series of satellite imagery samples depicting one or more reference agricultural areas over one or more entire crop cycles. Each of the multiple different time subseries may depict one or more of the reference agricultural areas over a different time window of one or more of the entire crop cycles.

Figure 9:
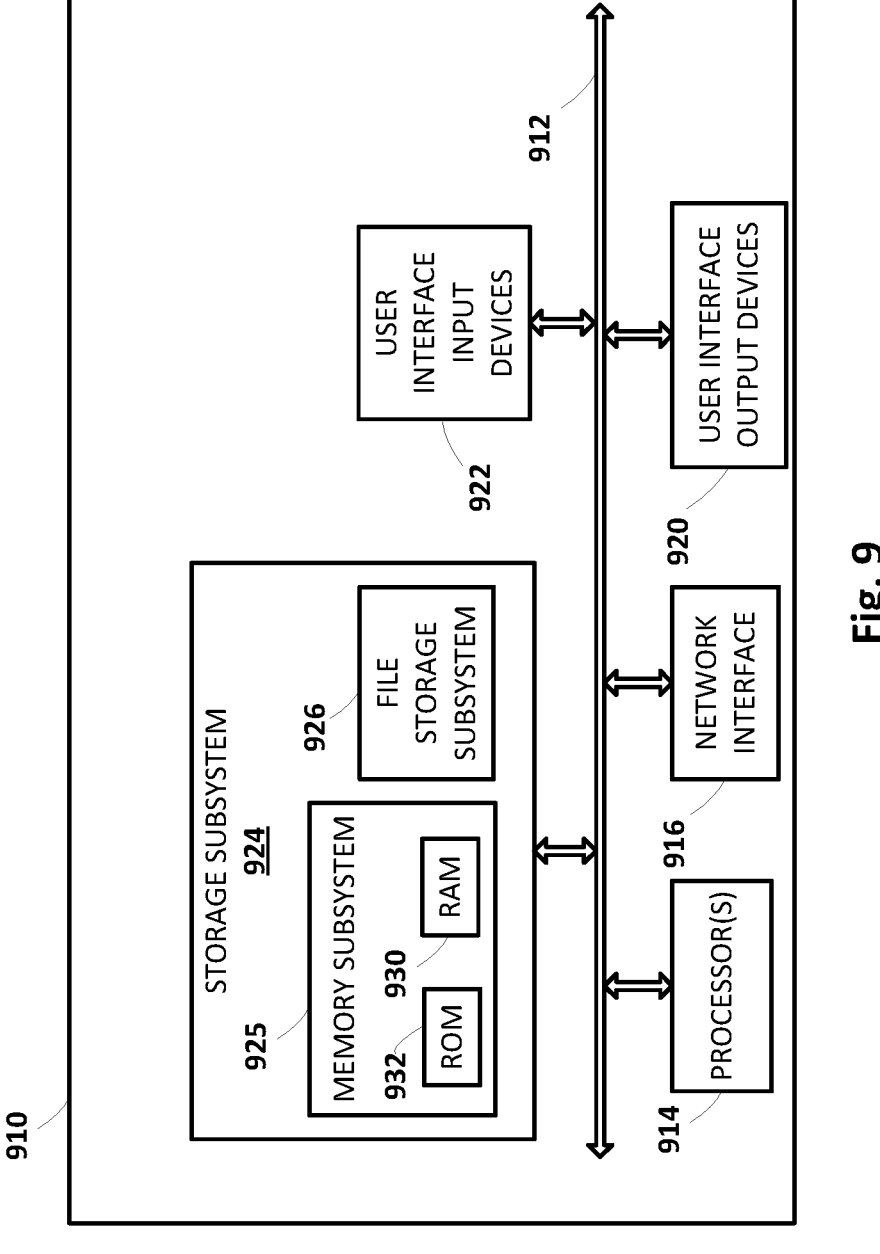
FIG. 9 schematically depicts an example architecture of a computer system.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 910 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods 700-800 described herein, as well as to implement various components depicted in FIGS. 1-2.

These software modules are generally executed by processor 914 alone or in combination with other processors. Memory 925 used in the storage subsystem 924 can include a number of memories including a main random-access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:

obtaining a time series of satellite imagery samples that depict an agricultural area over an entire crop cycle;

obtaining ground truth agricultural classifications associated with geographic units of the agricultural area that are represented by individual pixels of the satellite imagery samples;

masking one or more of the samples of the time series to generate a partially masked time series of satellite imagery samples;

based on the partially masked time series of satellite imagery samples, generating one or more input embeddings;

applying the one or more input embeddings across a machine learning model to generate one or more outputs, wherein the one or more outputs represent one or more in-season agricultural predictions for the geographic units of the agricultural area;

comparing the one or more in-season agricultural predictions with the ground truth agricultural classifications; and training the machine learning model based on the comparing, wherein subsequent to the training, the same machine learning model is usable to process other time series of satellite imagery samples depicting agricultural areas over disparate time windows of entire crop cycles to generate outputs representing in-season predictions.

2. The method of claim 1, wherein the masking comprises applying multiple different masks to the time series of satellite imagery samples to generate multiple different time subseries of satellite imagery samples.

3. The method of claim 2, wherein each of the multiple different time subseries of satellite imagery samples depict the agricultural area over a different time window of the entire crop cycle.

4. The method of claim 3, wherein the generating includes sampling one or more input embeddings from each of the multiple time subseries of satellite imagery samples to create a batch of input embeddings.

5. The method of claim 4, wherein the batch of input embeddings is applied across the machine learning model.

6. The method of claim 1, wherein the machine learning model comprises a transformer.

7. The method of claim 1, further comprising applying additional data representing labels of previous crop cycles as input across the machine learning model.

8. The method of claim 1, wherein the one or more in-season agricultural predictions for the geographic units of the agricultural area include, per geographic unit, one or more of: crop type; tillage; or irrigation.

9. A method implemented using one or more processors, comprising:

obtaining a time series of satellite imagery samples that depict an agricultural area over less than an entire crop cycle;

based on the time series of satellite imagery samples, generating a sequence of input embeddings; and applying the sequence of input embeddings across a single machine learning model to generate one or more outputs, wherein the one or more outputs represent one or more in-season agricultural predictions for geographic units of the agricultural area that correspond to pixels of the satellite imagery;

wherein the machine learning model is trained based on training data that includes multiple different time subseries generated from application of different masks to a time series of satellite imagery samples depicting a reference agricultural area over an entire crop cycle, wherein each of the multiple different time subseries depicts the reference agricultural area over a different time window of the entire crop cycle.

10. The method of claim 9, wherein the machine learning model comprises a transformer.

11. The method of claim 9, further comprising applying additional data representing labels of previous crop cycles as input across the machine learning model.

12. The method of claim 9, wherein the one or more in-season agricultural predictions for the geographic units of the agricultural area include, per geographic unit, one or more of: crop type; tillage; or irrigation.

13. A system comprising one or more processors and memory storing instructions that, in response to execution by the one or more processors, cause the one or more processors to:

obtain a time series of satellite imagery samples that depict an agricultural area over an entire crop cycle;

obtain ground truth agricultural classifications associated with geographic units of the agricultural area that are represented by individual pixels of the satellite imagery samples;

mask one or more of the samples of the time series to generate a partially masked time series of satellite imagery samples;

based on the partially masked time series of satellite imagery samples, generate one or more input embeddings;

apply the one or more input embeddings across a machine learning model to generate one or more outputs, wherein the one or more outputs represent one or more in-season agricultural predictions for the geographic units of the agricultural area;

compare the one or more in-season agricultural predictions with the ground truth agricultural classifications; and train the machine learning model based on the comparison, wherein subsequent to training, the same machine learning model is usable to process other time series of satellite imagery samples depicting agricultural areas over disparate time windows of entire crop cycles to generate outputs representing in-season predictions.

14. The system of claim 13, wherein the instructions to mask comprise instructions to apply multiple different masks to the time series of satellite imagery samples to generate multiple different time subseries of satellite imagery samples.

15. The system of claim 14, wherein each of the multiple different time subseries of satellite imagery samples depict the agricultural area over a different time window of the entire crop cycle.

16. The system of claim 15, wherein the instructions to generate include instructions to sample one or more input embeddings from each of the multiple time subseries of satellite imagery samples to create a batch of input embeddings.

17. The system of claim 16, wherein the batch of input embeddings is applied across the machine learning model.

18. The system of claim 13, wherein the machine learning model comprises a transformer.

19. The system of claim 13, further comprising instructions to apply additional data representing labels of previous crop cycles as input across the machine learning model.

20. The system of claim 13, wherein the one or more in-season agricultural predictions for the geographic units of the agricultural area include, per geographic unit, one or more of: crop type; tillage; or irrigation.

* * * * *